United States Patent [19]

Roche

[11] Patent Number: 4,729,403

[45] Date of Patent: Mar. 8, 1988

[54] TEST ASSEMBLY FOR WATER-FLOW ALARMS

[76] Inventor: Patrick Roche, 74 Ridge Rd., Upton, Mass. 01568

[21] Appl. No.: 783,867

[22] Filed: Oct. 3, 1985

[51] Int. Cl.[4] .................. F16K 37/00; G01M 19/00
[52] U.S. Cl. .................. 137/559; 251/208; 73/168
[58] Field of Search ............ 251/207, 208; 137/559; 73/168

[56] References Cited

U.S. PATENT DOCUMENTS 3,817,097  6/1974  Heroux .................. 73/168

FOREIGN PATENT DOCUMENTS 963446  2/1975  Canada .................. 137/559

*Primary Examiner*—A. Michael Chambers
*Attorney, Agent, or Firm*—Irving M. Kriegsman

[57] ABSTRACT

A test assembly for water-flow alarms having a housing made up of two sections. One section includes a control valve, and the other section a viewing chamber. The control valve is capable of a passing water therethrough at two distinct flow rates, one of which being equivalent to the flow rate passing through the orifice of a sprinkler. The viewing chamber contains a uniquely designed sight module therein through which the flow of water can be viewed. By incorporating the test assembly within a sprinkler system it is possible to reliably test a water-flow alarm without activating the sprinkler within the system.

1 Claim, 8 Drawing Figures

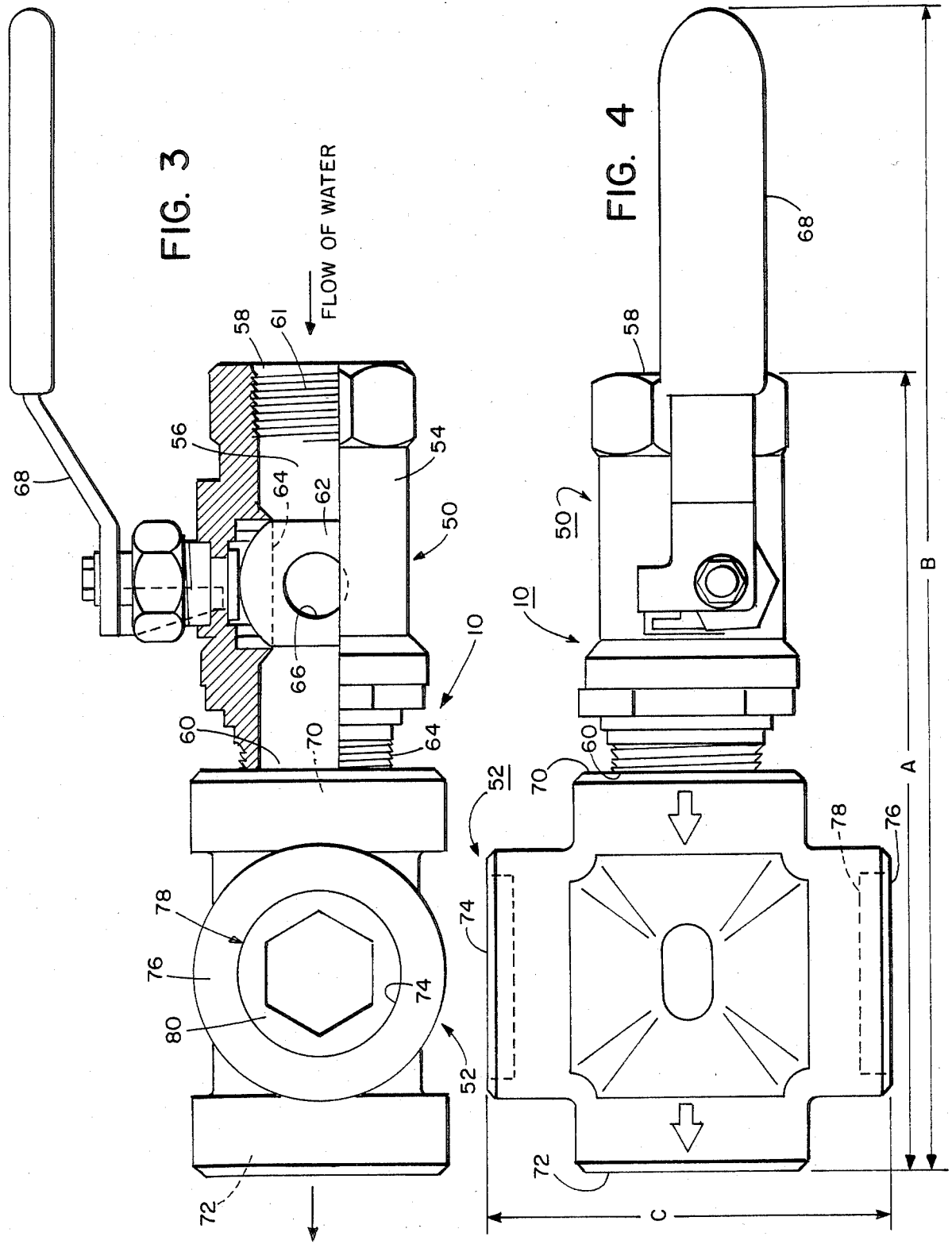

TEST ASSEMBLY FOR WATER-FLOW ALARMS

BACKGROUND OF THE INVENTION

This invention relates generally to sprinkler systems, and, more particularly, to a test assembly utilized in conjunction with sprinkler systems in order to aid in the testing of waterflow alarms or other liquid actuated in-line devices.

With the increased growth of business and industry there has also been a proportional increased loss of property as a result of fires. Additionally, with the advent of larger and larger buildings (many stories high, for example) it has become incresingly difficult to combat fires within such buildings. Even improved building construction material has had little effect on the successful combating of fires. As a result, more effort has been directed toward the development of effective sprinkler systems, and, to date, more modern sprinkler systems have proved to be highly successful in controlling fires.

More specifically, automatic sprinklers are devices which are connected by a main line to the building's water supply in order to distribute water upon a fire in sufficient quantity to either extinquish the fire completely or, at least, limit its spread until fire apparatus can be summoned to put out the fire. Water is fed to the sprinklers by way of a series of pipes, with the sprinklers connected thereto at spaced apart intervals. The sprinklers generally contain orifices of predetermined size so as to effectively control the flow of water sprayed from the sprinkler.

Under normal conditions, the sprinklers are closed preventing the flow of water therethrough. Each sprinkler contains a temperature sensitive element which, when activated, opens the normally closed sprinkler. There are numerous different types of automatic sprinklers; however, the present invention is concerned with sprinkler systems which rely upon the flow of water or other liquid therethrough to control the fire. For a sprinkler system to be complete it is essential that the sprinkler system include some type of water (liquid) flow alarm. Such a water flow alarm is a device capable of providing a warning signal when water flows through the risers, mains or pipes supplying the sprinklers. Thus, upon the activation of the sprinkler to extinquish or control the fire, the alarm provides immediate notification of the operation of the sprinklers and therefore warning of a fire, if, in fact, it was a fire which set off the sprinkler. With such a warning it is possible to summon appropriate fire extinquishing personnel, or if the sprinklers were inadvertently activated, to check and shut off the sprinklers before substantial water damage occurs.

The basic design of such a water-flow alarm includes a check valve which lifts from a seat when water flows through the system while preventing the back flow of water therethrough. It is the movement of the check valve or flapper which generally operates mechanically an alarm or an electrical switch to activate an alarm.

As effective as these sprinkler systems are, there still are times when as a result of obstructions in the lines or for other reasons water fails to flow through the water-flow alarm even when the sprinkler is activated and in the open (water flow) position. Such malfunction could prove to be disasterous since neither the alarm will sound nor will water flow through the sprinkler.

Consequently, it is essential that flow through the system containing the water flow alarm be tested without setting off the sprinkler. In other words, it is essential to simulate the operation of the sprinkler so as to effect water flow through the water-flow alarm.

Heretofore such a test system included a complex series of plumbing components made up of pipes, nipples, valves, a sight glass, elbows and a brass orifice disk interconnected together so as to simulate the operation of an activated sprinkler. It is clearly evident that past test systems were difficult to install, susceptable to leaks as a result of the many joints, bulky in construction, utilized leaky site glasses, and were extremely expensive to install. Nevertheless, to date, since such a test system as described above was generally the only one available, it is used with virtually all existing sprinkler systems. It would be highly desirable, however, if such a complex testing system could be replaced by a simple, inexpensive and reliable test system.

SUMMARY OF THE INVENTION

The present invention overcomes the problems associated with past water-flow alarm test systems as set forth in detail hereinabove by providing a simple, yet highly reliable test assembly for water-flow alarms. This test assembly is compact and incorporates therein a two position valve and viewing chamber.

The test assembly for water-flow alarms of this invention is made up of a housing formed of two major components, one being a flow control valve and the other being the viewing chamber. Although the major components of the present invention may be configured as an integral unit it is preferred that it be in the form of a pair of removable sections.

More specifically, the control valve is designed with an inlet opening and an outlet opening and has a rotatable element positioned therebetween. The rotatable element has a pair of orifices therein of differing size. One of the orifices is of a large size which permits the rapid flow of liquid therethrough while the other orifice is of a predetermined smaller size equivalent to the size of the orifice of a sprinkler associated with the sprinkler system in which the test assembly of this invention is incorporated. Consequently, when the rotatable element is positioned such that the smaller orifice is aligned with the inlet and outlet openings, the control valve simulates the operation of an open sprinkler.

Operably connected to the rotatable element is a handle which enables an operator to move the rotatable element to a first position in which the larger orifice is aligned with the inlet and outlet openings and a second position in which the smaller orifice is aligned with the inlet and outlet openings. In addition, the control valve is internally threaded adjacent the inlet opening and externally threaded adjacent the outlet opening. In this manner the control valve can be positioned within a sprinkler system adjacent the drain valve.

As mentioned above, the viewing chamber is removably mounted to the control valve. This mounting arrangement is effected by screwing the viewing chamber to the external thread outlet opening of the control valve. More specifically, the viewing chambers is in the form of what is more commmonly referred to as an "iron cross" having four openings therein. One opening mates with the outlet opening of the control valve while the second opening which is aligned therewith is utilized to drain flowing water therethrough. All four openings have internal threads therein. The third opening can be sealed by a conventional plug. However, in most instances, the third and the fourth openings are each plugged by means of a uniquely designed sight module.

Each sight module is made preferably of a molded, sturdy, yet somewhat pliable, transparent material in the form of a polycarbonate resin such as Lexan manufactured by General Electric. This sight module has external threads molded thereon of a size capable of threadably engaging the internal threads of the openings of the "iron cross".

Additionally, the sight module has a specifically configured center in order to enable an appropriately designed tool to be used therewith in order to insert or remove the module from the opening. The utilization of this particular sight module within the test assembly of the present invention enables the test assembly to withstand approximately 350 pounds of pressure without leaking.

With the utilization of the test assembly of the present invention installed within a Conventional sprinkler system it is possible to quickly test any deivce, such as a water-flow alarm, which operates by the flow of a liquid therethrough without activating the sprinkler.

It is therefore an object of this invention to provide a compact, highly effective test assembly for device operated by the flow of liquid.

It is another object of this invention to specifically provide a test assembly for water-flow alarms.

It is a further object of this invention to provide a test assembly for water-flow alarms which is virtually leak proof.

It is still another object of this invention to provide a test assembly for water-flow alarms which incorporates therein a two position control valve and viewing chamber.

It is an even further object of this invention to provide a test assembly for water-flow alarms which can be readily used with any type of sprinkler system.

It is still a further object of this invention to provide a test assembly for water-flow alarms which utilizes a minimum number of components and is therefore economical to produce and capable of being readily mass produced.

It is another object of this invention to provide a new and improved plug.

It is still another object of this invention to provide a new and improved sight valve.

For a better understanding of the present invention, together with other and further objects thereof, reference is mow made to the following description taken in conjunction with the accompanying drawings and its scope will be pointed out in the appended claims.

BRIEF DESCRIPTION OF THE DRAWINGS

FIG. 3 is a side elevational view of the test assembly for water-flow alarms of the present invention and shown partly in cross-section, FIG. 4 is a top view of the test assembly shown in FIG. 3.

DETAILED DESCRIPTION OF THE PREFERRED EMBODIMENT

Figure 1:
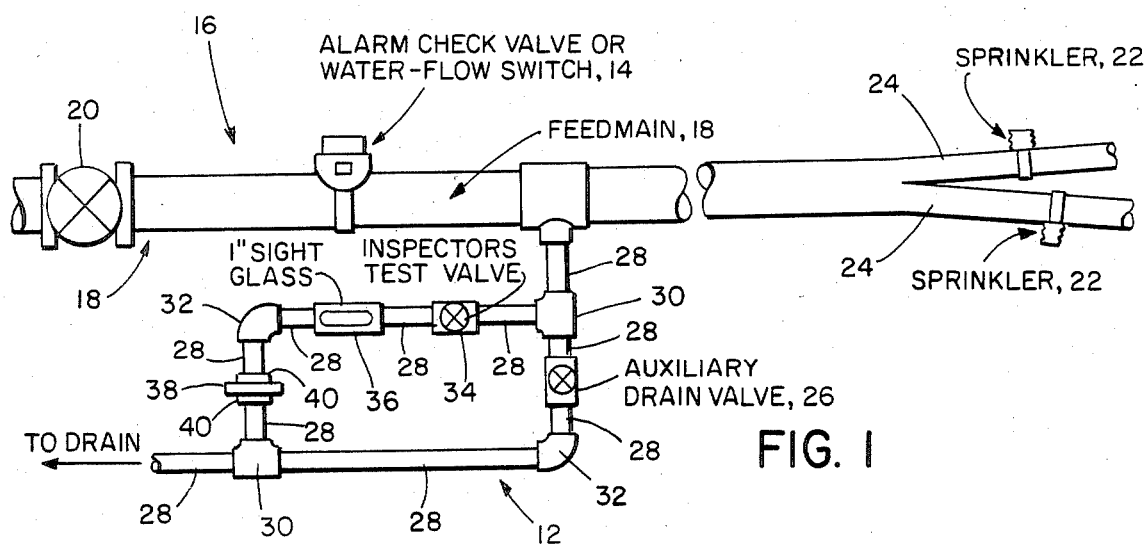
FIG. 1 is a schematic representation of a sprinkler system which incorporates therein a prior art water-flow alarm test system.
Figure 2:
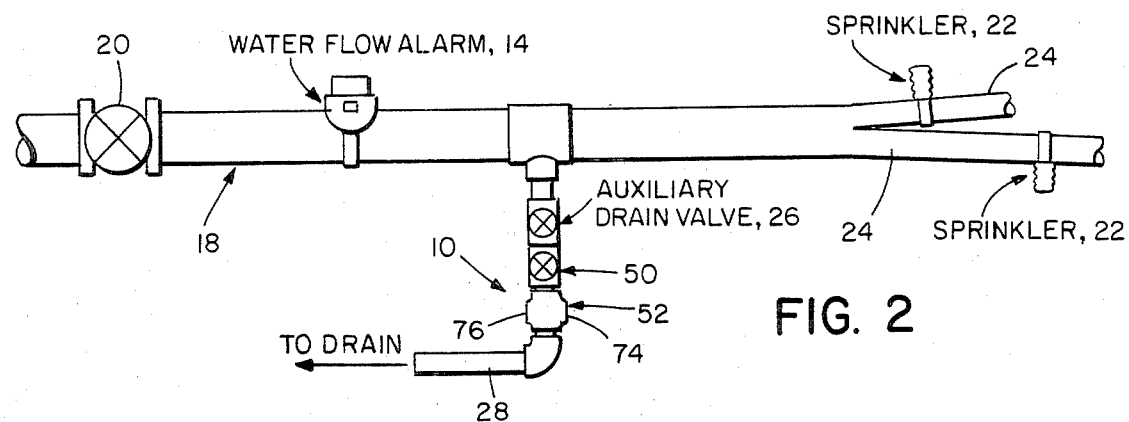
FIG. 2 is a schematic representation of a sprinkler system which incorporates therein the test assembly for water-flow alarms of the present invention.
Figure 5:
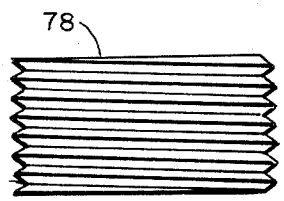
FIG. 5 is a front elevation view of the sight module shown in FIG. 3.
Figure 8:
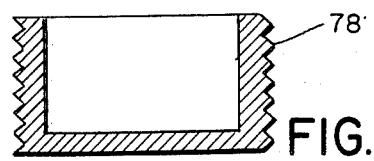
FIG. 8 is a section view of the sight module shown in FIG. 3.
Figure 6:
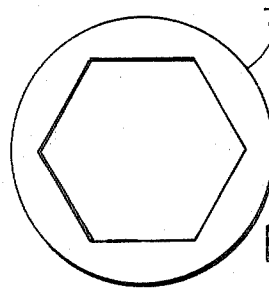
FIG. 6 is a top view of the sight module shown in FIG. 3.
Figure 7:
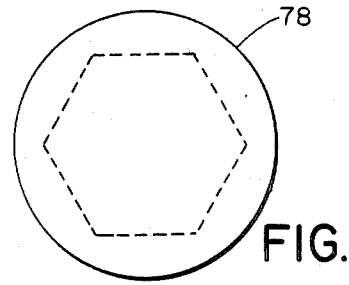
FIG. 7 is a bottom view of the sight module shown in FIG. 3.

In order to more fully appreciate the inventive concept embodied by the test assembly 10 for water-flow alarms of the present invention as clearly depicted in FIGS. 2 and 3 of the drawings, reference is first made to FIG. 1 of the drawings which clearly illustrates the type of prior art test system 12 for water-flow alarms utilized in the past. It should also be realized that although the description set forth hereinbelow refers to both test assembly 10 and test system 12 as being used with water-flow alarms 14, both the prior art test system 12 and the test assembly 10 of this invention are capable of being used with any type of flowing liquid and/or device whose operation is dependent upon this flow of liquid. Consequently, hereinafter the term water should be considered to be synonymous with the term liquid, and the term alarm covers any number of different types of devices activated by the flow of a liquid.

As shown in FIG. 1 a typical conventional sprinkler system 16 is connected to a main inlet line 18 (or feed main) having a main control valve 20 connected therewith. Conventional sprinklers 22, which vary in number in accordance with the size and shape of the building, are inconnected to smaller sized pipes 24 which branch off the main line 18.

Also interconnected to main line 18 is a conventional water-flow alarm 14. Although only one such water-flow alarm 14 is shown in FIG. 1 there may be other such alarms associated with each of the pipes 24. If such an arrangement is used than each pipe 24 should also have a test system 12 associated therewith. A more detailed description of a typical water-flow alarm 14 and sprinkler 22 is set forth hereinabove in the Background of the Invention.

More specifically, prior art test systems such as illustrated in FIG. 1 incorporates therein numerous elements. Although most water lines include an auxilliary drain valve 26, a typical prior art test system 12 further includes approximately ten nipples 28, two T-shaped fittings 30, a pair of elbows 32, a test valve 34, a sight glass 36, and a brass orifice disk 38 with associated joining elements 40. It is quite apparent that because of the complex conglomeration of plumbing accessories constructing test system 12 is extremely time consuming. In addition, upon completion, test system 12 is susceptible to leakage at the various connecting joints as well as at the sight glass 36. In fact, prior sight glasses are typically capable of withstanding only approximately 60 pounds of pressure before leaking.

In operation, test system 12 involves a number of time consuming steps. When the testing of alarm 14 is required, drain valve 26 must be closed. At this point test valve 34 is opened so that water will flow through water-flow alarm 14. The flow rate of water therethrough is regulated by the size of the orifice disk 38 with the sight glass 36 being utilized to visually inspect the flow of water through the system. If alarm 14 is operational it will operate upon the flow of water therethrough. Thereafter, test valve 34 is closed and the sprinkler system 16 is ready for use. Complete draining of the system is accomplished by shutting main control valve 20 and opening drain valve 26. This action will permit water in upper pipes 24 to drain out of the system.

The test assembly 10 of the present invention illustrated in FIGS. 2 and 3 of the drawings replaces many of the elements of prior testing system 12 with a single unit in the form of a pair of components; (1) a control valve 50 and (2) a viewing chamber 52. As shown in FIG. 2, test assembly 10 is interconnected adjacent the drain valve 26 and thereby eliminates the need for elaborate piping as with testing system 12.

A clearer illustration of test assembly 10 of the present invention is set forth in FIG. 3 of the drawings. As illustrated therein test assembly 10 is made up of a housing preferably including control valve 50 and viewing chamber 52 removeably interconnected to one another. Although it should be realized that these components may be of an integral, unitary construction, the two part construction illustrated is preferred.

Reference is first made to control valve 50. Valve 50 has an elongated body 54 having a longitudinally extending passageway 56 passing therethrough and terminating with an inlet opening 58 and an outlet opening 60. With the embodiment set forth in FIG. 3, the inlet opening 58 has internal threads 61 and the outlet opening 60 has external threads 64.

Interposed within passageway 56 is a rotatable element 62. Rotatable element 62 has a first orifice 64 therein and a second orifice 66 therein aligned perpendicular to the first orifice 64. The just orifice 64 is of a larger size than orifice 66 since its main function is to act in conjunction with an open drain valve 26 to drain the system in a manner descibed in greater detail hereinbelow. Orifice 66 is of a predetermined size which matches the size of the orifice formed with sprinklers 22. In this way when orifice 66 is aligned with passageway 56, test assembly 10 simulates the activation of sprinkler 22.

Operably connected to rotatable element 62 is a handle 68. Turning of handle 68 moves rotatable element 62 between two distinct positions; (1) a first position in which orifice 64 aligns with passageway 56 as shown in FIG. 3, and (2) a second position (not shown in the drawings) in which hole 66 aligns with passageway 56. Consequently, test assembly 10 with a single action enables an operator to either drain the system quickly or simulate the activation of a sprinkler 22.

Reference is now made to the viewing chamber 52. Viewing chamber 52 is in the form of a fitting more commonly referred to as a "cast iron cross" having four openings therein; 70, 72 and 74 and an opening 76 shown in FIG. 2 and located opposite opening 74. All of these openings generally contain internal threads therein. In this manner the threads of opening 70 can mate with the external threads 64 of outlet opening 60 of control valve 50. Opening 72 remains open at all times to enable water flow therethrough while openings 74 and 76 are plugged.

More specifically, openings 74 and 76 are each plugged with a separate specifically designed sight module 78. Sight module 78 is a cylindrical plug or disc shaped body and is molded of sturdy, yet pliable, transparent, waterproof, high strength material such as a polycarbonate resin known as Lexam and manufactured by General Electric. Module 78 is molded to include threads on its external surface thereof capable of matingly engaging the internal threads of openings 74 and 76. Sight module 78 provides for a water tight seal capable of withstanding up to approximately 350 pounds of pressure. Although any other suitable plug and gasket combination may be used with one of the openings 74 and 76 it is desirable that a sight module 78 may be utilized therewith on each one of openings 74 and 76 in order to aid in the visual inspection of the low of water through test assembly 10 by looking either through opening 74 or opening 76. In addition, sight module 78 has a recessed hexagonally shaped central portion 80 capable of mating with a specially designed "Allen wrench" type tool. By the use of such a tool each sight module 78 may be either securely positioned within openings 74 and 76 or removed therefrom.

MODE OF OPERATION

During the testing of water-flow alarm 14 with test assembly 10 of the present invention, it is merely necessary to rotate handle 68 of control valve 50 such that rotatable element 62 is in the position where orifice 66 is aligned with passageway 56. Auxiliary drain valve 26 is then opened.

As seen from FIG. 2 of the drawings, under the above conditions water will flow through water-flow alarm 14 through valve 26 and through test assembly 10 and exit to the drain. Movement of this flowing water can be observed through sight modules 78 in viewing chamber 52. There are no complex piping arrangements necessary with the test assembly 10 of the present invention.

Once it has been determined that the system is operating properly, it is merely necessary to shut off drain valve 26. If it is desirable to drain the system, it is merely necessary to close valve 20, rotate handle 68 until element 62 has its larger orifice 64 aligned with passageway 56, and open drain valve 26. Clearly the operation of test assembly 10 is simple, and yet as a result of the minimal number of joints and uniquely designed viewing chamber 52 and sight module is virtually leak proof.

Although this invention has been described with reference to a particular embodiment, it will be understood that this invention is also capable of further and other embodiments within the spirit and scope of the appended claims.

I claim:

1. A test assembly for a device activated by the flow of a liquid, said device being an alarm forming part of a sprinkler system, said sprinkler system including a sprinkler having an orifice of preselected size therein, said test assembly comprising:
    a. a control valve for controlling the flow of said liquid therethrough between a first preselected flow rate and a second preselected flow rate, said second preselected flow rate being equivalent to the flow rate passing through said orifice of preselected size in said sprinkler; and
    b. a viewing chamber for permitting the viewing of said flow of liquid therethrough,
    c. said control valve including a housing having an inlet opening and an outlet opening, said inlet opening being internally threaded for connection to an externally threaded coupling, said outlet opening being externally threaded, a rotatable element located within said housing, said rotatable element having a first orifice therein of preselected size to permit said flow of liquid therethrough in order to establish said first preselected flow rate and a second orifice therein of preselected size to permit said flow of liquid therethrough to establish said second preselected flow rate, and means for rotating said rotatable element between a first position in which said first preselected flow rate is established and a second position in which said second preselected flow rate is established, said preselected size of said second orifice of said valve means being substantially equal to said preselected size of said orifice in sprinkler, d. said viewing chamber including a housing and a transparent sight module, said housing comprising a cast iron cross, said cast iron cross having four internally threaded circular openings, said sight module comprising a molded transparent disc shaped plastic waterproof body having external threads thereon and being internally recessed from one side in a uniqued multisided configuration so that it can be screwed into and removed from an internally threaded opening using a correspondingly shaped tool, said sight module being screwed into one of said internally threaded openings in said cast iron cross, said outlet end of said control valve housing being screwed into another one of said internally threaded openings in said cast iron cross.

* * * * *